Nov. 11, 1952  C. BOSCH  2,617,692

INSTRUMENT PIVOT

Filed Oct. 13, 1949

INVENTOR.
Carl Bosch

Patented Nov. 11, 1952

2,617,692

UNITED STATES PATENT OFFICE 2,617,692

INSTRUMENT PIVOT

Carl Bosch, Arlington, N. J., assignor to Chatham Electronics Corporation, Newark, N. J., a corporation of New Jersey Application October 13, 1949, Serial No. 121,147

2 Claims. (Cl. 308—2)

This invention relates to an instrument pivot and has particular reference to a pivoted mounting which has freedom of motion and wide tolerances.

The usual form of instrument pivot comprises a structure having a shaft with cone-pointed ends fitting into cone-shaped depressions in very hard material. If such a structure is carefully and accurately made it will give good service. However, if the shaft is too long there will be a binding action, and if the shaft is too short there will result an unstable mounting with side play and the readings will not be accurate. Change in temperature may affect the parts of such a pivot mounting to change the adjustment and produce faulty readings.

Many modifications have been proposed to remedy the above disadvantages. Single pivot structures have been used but they must be kept on a level plane to give accurate readings. Spring pressed pivots and pivot mountings have been used but they all introduce a certain amount of friction which lowers the accuracy.

One of the objects of this invention is to provide an improved instrument pivot which avoids one or more of the disadvantages and limitations of prior art arrangements.

Another object of the invention is to lower the cost of instrument pivots by providing a design which permits of wide tolerances in manufacture while still producing a satisfactory mounting without binding action or side-play.

Another object of the invention is to provide an instrument pivot which does not require accurate horizontal placement to obtain an accurate reading.

The invention comprises an upper pivot bearing for rotatably supporting an indicating mechanism which comprises a pointed shaft turning in a cone-shaped depression. The upper bearing supports most of the weight of the moving element. The lower bearing includes a slot component in which a pointed shaft or a knife edge is rockably disposed. The lower bearing guides the moving element and prevents side-play. The center of gravity of the moving indicating mechanism is located on the line which connects the two pivot points. Because of weight and inertia limitations the preferred arrangement uses the upper pointed shaft and the lower knife edge as the moving elements, but it is obvious that either bearing component may be used as the moving element.

A feature of the invention includes the angular mounting of the pivot line and the consequent angular mounting of the scale and pointer.

For a better understanding of the present invention, together with other and further objects thereof, reference is made to the following description taken in connection with the accompanying drawings.

Figure 1:
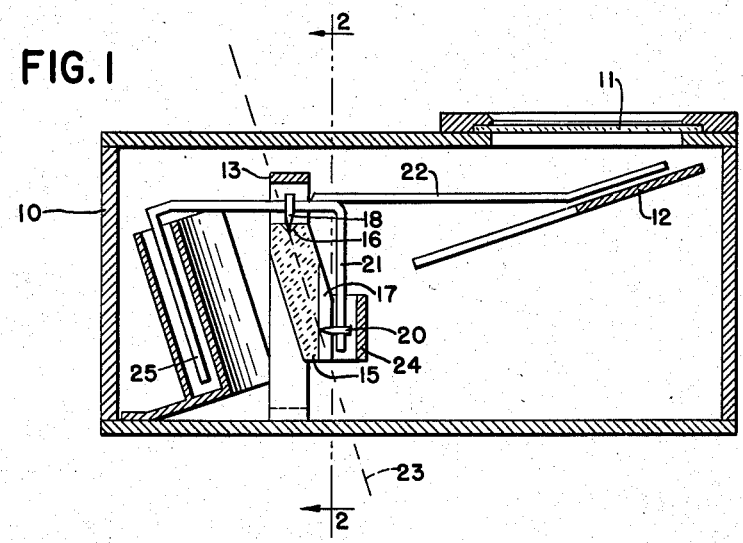
Fig. 1 is a sectional view of an instrument in a case showing the details of the pivot arrangement.
Figure 2:
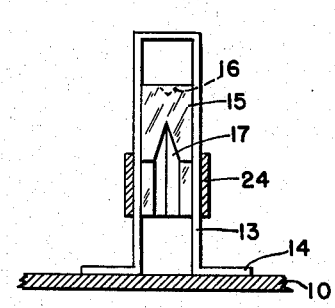
Fig. 2 is a side view of the stationary component of the pivot structure taken along line 2—2 of Fig. 1.

Referring now to Figs. 1 and 2, the pivot structure is shown mounted in a case 10 with a window 11 mounted over a calibrated scale 12. The pivot structure is held by a bracket 13 which is secured to the bottom of the case by screws or bolts engaging bent over portions 14. A stationary pivot element 15 is held by cement or other suitable adhesive material between the two upright portions of the bracket 13, and includes a top bearing component 16 and a lower bearing component 17.

The top bearing comprises the cone-shaped depression 16 and a pointed shaft 18. This bearing supports most of the weight of the moving element. The lower bearing comprises the V-shaped slot 17 and a second pointed shaft 20. The two pointed shafts 18 and 20 are secured to a moving element frame 21 which may assume any convenient shape depending upon the instrument requirements and the nature of the physical quantity to be measured.

A pointer 22 is secured to frame 21 and extends to the scale 12. The end of the pointer and the scale are angularly disposed in the case to be substantially at right angles to a line 23 which connects the two pivot points and constitutes the axis of rotation of the moving system. The value of this angle may be as small as 10 degrees or as large as 35 degrees.

As indicated in Fig. 1, the upper pivot 18 is mounted with its cone axis in a vertical position. This method of mounting is obviously the strongest and most stable since the upper pivot carries almost all the weight of the moving element. The lower pivot 20 bears against the junction of two plane surfaces which is vertical and therefore for the greatest strength and wearing qualities the axis of the pivot cone should be horizontal or at right angles to the upper pivot axis. This angular requirement is not rigorous, however, and the angle between pivot axes may vary between 75 and 100 degrees without seriously affecting the operation of the instrument.

In order to protect the pivot arrangement and to insure that the pivot structures will always be properly seated, a cage or limiting structure is built around the device. Above the upper pivot the top-most portion of the bracket 13 provides the necessary protection while an additional bracket member 24 protects the lower pivot and prevents its dislocation during the times when it is not in a horizontal position.

The element which moves the indicating mechanism is indicated in Fig. 1 by a block 25 which may include any of the usual motor arrangements which are used to show voltage, current, wattage, or other physical quantities. The moving element must be so proportioned that its center of gravity lies on or near the line 23. This requirement insures that the instrument is independent of the position in which it is placed and is the usual adjustment provided for all high quality measuring instruments of this type.

When this instrument is in operation it may be placed in any position which insures that both pivot points are in contact with their associated bearing structures. This means that the case may be tipped back (rotated counter-clockwise in Fig. 1) until the lower side of the cone-shaped depression 16 is almost horizontal and may be tipped in the reverse direction until the line 23 is almost vertical.

Figure 3:
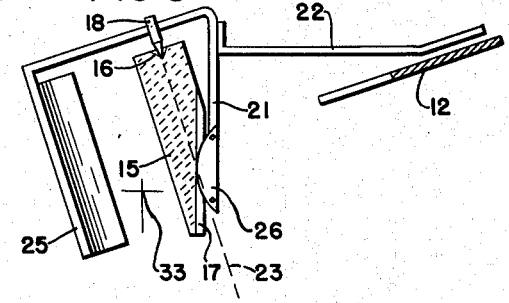
Fig. 3 is a cross sectional view of an alternate arrangement wherein a knife edge is used instead of a pointed shaft.

Fig. 3 shows an alternate arrangement which is the same as Fig. 1 except that a knife edge 26 replaces the pointed shaft 20. The operation is the same as the above described mechanism.

Figure 4:
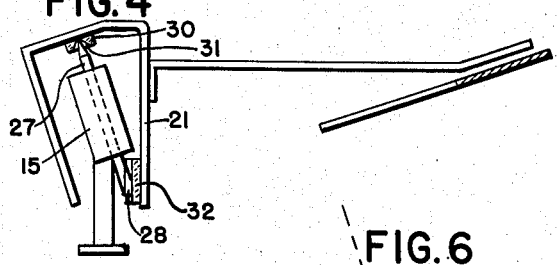
Fig. 4 is a cross sectional view of another alternate arrangement wherein the shaft is stationary and the cone-shaped depression, together with the V-shaped slot, is mounted on the movable element.

Fig. 4 shows another alternate arrangement wherein the pivot structures of Fig. 3 are reversed. The stationary elements of Fig. 4 are an upper pointed shaft 27 and a lower knife edge 28. The moving elements are an upper bearing member 30 having a cone-shaped depression 31 and a lower bearing member 32 having a V-shaped slot.

Figure 5:
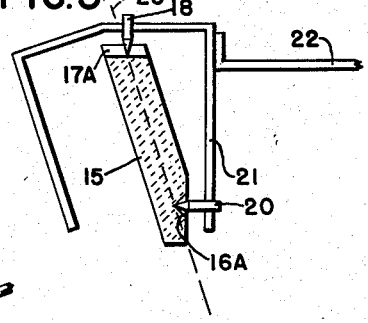
Fig. 5 is a cross sectional view of another alternate arrangement wherein a horizontal slot bearing is used for the upper pivot point and the cone-shaped depression is used for the lower pivot point.

Fig. 5 shows another alternate arrangement in which a horizontal slot 17A supports the upper pivot point and a cone depression 16A engages the lower pivot point 20.

Figure 6:
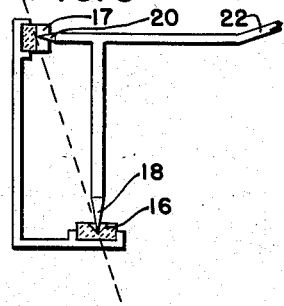
Fig. 6 is a cross sectional view of another alternate arrangement wherein a vertical slot is used for the upper bearing and the cone-shaped depression supports the lower pivot point.

Fig. 6 shows still another arrangement which is similar to Fig. 1 except the slot and cone depression are interchanged. The operation is the same as the operation of the bearing shown in Fig. 1.

When the above described instrument pivots are used in portable instruments which are not required to be placed in a level position, the center of gravity should be adjusted so that it lies on or quite close to the line 23 which connects the pivot points. When this is done, as has been explained above, the reading will not be affected by small changes in the horizontal alignment. Such a movement requires the installation of a return force component, such as a spring, to return the pointer to zero when there is no applied measuring force and to oppose the applied force when a reading is being made.

By suitable weight adjustments, however, the above instrument pivot may be made adaptable to work without any return force components.

The center of gravity of the movement is placed out of line with the pivot points at a position such as 33 in Fig. 3. Then the instrument case must be adjusted to a horizontal position by leveling screws or other convenient leveling device, and readings may then be made, using only the off-axis' weight to restore the moving system. Such a system is applicable to laboratory measuring instruments that are permanently installed in an adjusted position.

While the above described instrument pivots have been designed to be used with electrostatic voltmeters, they may be adaptable to the usual moving-coil type of measuring instruments for voltage, current, power, or any other quantity requiring a magnetic moving force. In order to accommodate the coil and magnetic system, the two pivot points engage bearing blocks which are separately mounted, leaving the space between them for the moving coil which rotates about the line 23 as an axis.

It will be obvious that the pivot device described above will not bind or produce side-play. Excessive temperature changes which may alter the dimensions of the parts will have no effect on the free working of the bearing structure. Manufacturing tolerances need not be so severe as in the usual type of bearing since small changes in the dimensions of either the stationary or moving elements cause no effect on the accuracy of the instrument.

While there have been described and illustrated specific embodiments of the invention, it will be obvious that various changes and modifications may be made therein without departing from the field of the invention which should be limited only by the scope of the appended claims.

I claim:

1. A pivot arrangement for indicating instruments comprising, a rotatable indicating mechanism including two pointed cone-shaped pivots mounted thereon at right angles to each other, and a stationary member having a cone-shaped depression for supporting one of said pivots and a V-shaped slot for supporting the other of said pivots, the indicating mechanism having a center of gravity which lies adjacent to a line between the two pivot points.

2. A pivot arrangement for indicating instruments comprising, a rotatable indicating mechanism including two pointed cone-shaped pivots mounted thereon with their axes disposed at an angle which lies within the range of 75 and 100 degrees, and a stationary member for rotatably supporting the indicating mechanism having a cone-shaped depression for supporting one of said pivots and a V-shaped slot for supporting the other of said pivots, the indicating mechanism having a center of gravity which lies adjacent to a line between the two pivot points.

CARL BOSCH.

REFERENCES CITED

The following references are of record in the file of this patent:

UNITED STATES PATENTS

| Number | Name | Date |
|---|---|---|
| 1,023,496 | Bary | Apr. 16, 1912 |
| 1,109,838 | Hedman | Sept. 8, 1914 |
| 1,294,450 | Hapgood | Feb. 18, 1919 |
| 2,021,061 | Hedman | Nov. 12, 1935 |
| 2,069,908 | Wells | Feb. 9, 1937 |